United States Patent
Lev et al.

(10) Patent No.: US 10,515,150 B2
(45) Date of Patent: *Dec. 24, 2019

(54) DATA DRIVEN SPEECH ENABLED SELF-HELP SYSTEMS AND METHODS OF OPERATING THEREOF

(71) Applicant: GENESYS TELECOMMUNICATIONS LABORATORIES, INC., Daly City, CA (US)

(72) Inventors: Yoni Lev, Tel Aviv (IL); Tamir Tapuhi, Ramat-Gan (IL); Avraham Faizakof, Kfar-Warburg (IL); Amir Lev-Tov, Bat-Yam (IL); Yochai Konig, San Francisco, CA (US)

(*) Notice: Subject to any disclaimer, the term of this patent is extended or adjusted under 35 U.S.C. 154(b) by 70 days.

This patent is subject to a terminal disclaimer.

(21) Appl. No.: 14/799,369

(22) Filed: Jul. 14, 2015

(65) Prior Publication Data
US 2017/0018269 A1    Jan. 19, 2017

(51) Int. Cl.
*G06F 17/27* (2006.01)
*G10L 15/18* (2013.01)

(52) U.S. Cl.
CPC ...... *G06F 17/2775* (2013.01); *G10L 15/1815* (2013.01)

(58) Field of Classification Search
CPC ............... G06F 17/279; G06F 17/2211; G06F 17/2247; G06F 17/2705; G06F 17/274; G06F 17/2755; G06F 17/2775; G06F 17/2785; G06F 17/30598; G06F 17/30705; G06F 17/30713; G06F 17/30976; G06F 16/24578; G06F 16/35; G06F 16/433; G06F 16/9535; G06F 17/212; G06F 3/048;
(Continued)

(56) References Cited

U.S. PATENT DOCUMENTS 6,009,392 A    12/1999    Kanevsky et al.
6,332,154 B2    12/2001    Beck et al.
(Continued)

FOREIGN PATENT DOCUMENTS

JP    2000339314 A    12/2000
WO    2007118324 A1    10/2007

OTHER PUBLICATIONS

Fiscus, Jon. "Sclite scoring package version 1.5." US National Institute of Standard Technology (NIST), URL <http://www.itl.nist.gov/iad/mig/tools/> (1998).
(Continued)

*Primary Examiner* — Abdelali Serrou

(57) ABSTRACT

A method for configuring an automated, speech driven self-help system based on prior interactions between a plurality of customers and a plurality of agents includes: recognizing, by a processor, speech in the prior interactions between customers and agents to generate recognized text; detecting, by the processor, a plurality of phrases in the recognized text; clustering, by the processor, the plurality of phrases into a plurality of clusters; generating, by the processor, a plurality of grammars describing corresponding ones of the clusters; outputting, by the processor, the plurality of grammars; and invoking configuration of the automated self-help system based on the plurality of grammars.

10 Claims, 12 Drawing Sheets

(58) Field of Classification Search
CPC .. G06F 3/04842; G06F 3/04847; G06F 3/167; G06F 16/3329; G06F 9/451; G10L 2015/223; G10L 15/063; G10L 15/1815; G10L 15/1822; G10L 15/19; G10L 15/26; G10L 2015/0631; G10L 15/08; G10L 15/10; G10L 15/14; G10L 15/30; G10L 15/32; G10L 17/08; G10L 17/22; G10L 2015/085; G10L 15/183; G10L 15/22; G10L 15/18; G10L 15/1807; G10L 15/02; G10L 25/30; G10L 15/193; G10L 15/197

See application file for complete search history.

(56) References Cited

U.S. PATENT DOCUMENTS

| | | | |
|---|---|---|---|
| 6,532,444 B1 | 3/2003 | Weber | |
| 6,636,831 B1 | 10/2003 | Profit, Jr. et al. | |
| 7,373,300 B1 | 5/2008 | Bangalore et al. | |
| 7,487,094 B1* | 2/2009 | Konig | G10L 15/19 379/88.01 |
| 8,630,860 B1* | 1/2014 | Zhang | G10L 15/26 704/275 |
| 8,774,392 B2* | 7/2014 | Odinak | H04M 3/51 379/265.09 |
| 8,903,712 B1 | 12/2014 | Tremblay et al. | |
| 9,571,652 B1* | 2/2017 | Zeppenfeld | H04M 3/523 |
| 9,817,813 B2* | 11/2017 | Faizakof | G10L 15/1815 |
| 2001/0049601 A1* | 12/2001 | Kroeker | G06F 17/271 704/254 |
| 2003/0004719 A1* | 1/2003 | Yuschik | G10L 15/065 704/246 |
| 2003/0154077 A1 | 8/2003 | Tahara et al. | |
| 2004/0030552 A1* | 2/2004 | Omote | G10L 15/063 704/245 |
| 2005/0055399 A1 | 3/2005 | Savchuk | |
| 2006/0116877 A1* | 6/2006 | Pickering | G10L 15/08 704/231 |
| 2006/0178884 A1 | 8/2006 | Acero et al. | |
| 2007/0100624 A1* | 5/2007 | Weng | G06F 17/2715 704/257 |
| 2007/0260724 A1* | 11/2007 | Rowley | G06Q 10/10 709/223 |
| 2008/0134058 A1 | 6/2008 | Shen et al. | |
| 2008/0189187 A1* | 8/2008 | Hao | G06F 17/243 705/26.41 |
| 2009/0094030 A1* | 4/2009 | White | G10L 15/26 704/246 |
| 2009/0199235 A1* | 8/2009 | Surendran | G06Q 30/02 725/34 |
| 2010/0057463 A1* | 3/2010 | Weng | G06F 17/27 704/257 |
| 2010/0074112 A1* | 3/2010 | Derr | H04L 41/12 370/232 |
| 2010/0162101 A1 | 6/2010 | Anisimov et al. | |
| 2010/0228540 A1 | 9/2010 | Bennett | |
| 2011/0230229 A1 | 9/2011 | Das et al. | |
| 2011/0282662 A1* | 11/2011 | Aonuma | G10L 17/26 704/231 |
| 2012/0065982 A1 | 3/2012 | Ativanichayaphong et al. | |
| 2012/0158399 A1* | 6/2012 | Tremblay | G10L 15/063 704/9 |
| 2013/0124195 A1 | 5/2013 | Ehsani et al. | |
| 2014/0006319 A1 | 1/2014 | Anand et al. | |
| 2014/0028780 A1* | 1/2014 | Croen | H04N 21/42203 348/14.03 |
| 2014/0067375 A1* | 3/2014 | Wooters | G06F 17/28 704/9 |
| 2014/0163968 A1 | 6/2014 | Ehsani et al. | |
| 2014/0188475 A1* | 7/2014 | Lev-Tov | G06F 17/30389 704/254 |
| 2014/0200891 A1 | 7/2014 | Larcheveque et al. | |
| 2014/0258503 A1* | 9/2014 | Tong | H04L 12/1827 709/224 |
| 2014/0307864 A1* | 10/2014 | Odinak | H04M 3/51 379/265.09 |
| 2015/0032448 A1* | 1/2015 | Wasserblat | G10L 15/26 704/235 |
| 2015/0032746 A1 | 1/2015 | Lev-Tov et al. | |
| 2015/0058006 A1 | 2/2015 | Proux | |
| 2015/0058013 A1 | 2/2015 | Pakhomov et al. | |
| 2015/0178371 A1 | 6/2015 | Seth et al. | |
| 2015/0194149 A1 | 7/2015 | Faizakof et al. | |
| 2015/0195406 A1* | 7/2015 | Dwyer | H04M 3/5175 379/265.07 |
| 2015/0256675 A1 | 9/2015 | Sri et al. | |
| 2015/0310508 A1 | 10/2015 | Pattekar et al. | |
| 2015/0339288 A1* | 11/2015 | Baker | G06F 17/2705 704/9 |
| 2015/0339376 A1 | 11/2015 | Wieweg et al. | |
| 2016/0012820 A1* | 1/2016 | Mun | G10L 15/32 704/251 |
| 2017/0054848 A1 | 2/2017 | Meng et al. | |
| 2017/0116173 A1 | 4/2017 | Lev-Tov et al. | |
| 2017/0118336 A1 | 4/2017 | Tapuhi et al. | |

OTHER PUBLICATIONS

Rosenfeld, R., "Two Decades of Statistical Language Modeling: Where Do We Go From Here?" Proceedings of the IEEE, vol. 88, pp. 1270-1278, 2000.

U.S. Appl. No. 14/150,628, entitled "Generalized Phrases in Automatic Speech Recognition Systems," filed Jan. 8, 2014, 39 pages.

U.S. Appl. No. 14/586,730, entitled "System and Method for Interactive Multi-resolution Topic Detection and Tracking," filed Dec. 30, 2014, 52 pages.

International Search Report and Written Opinion for Application No. PCT/US2016/014626, dated Sep. 12, 2016, 20 pages.

Guan, Xiaojun et al., Domain identification by clustering sequence alignments, Glaxo Wellcome Research and Development, 1998, pp. 783-785.

International Search Report and Written Opinion for Application No. PCT/US2016/057775, dated Feb. 1, 2017, 20 pages.

Konig, Y. et al., GDNN: A Gender-Dependent Neural Network for Continuous Speech Recognition, International Computer Science Institute, Berkeley, CA, Dec. 1991, 8 pages.

Pei, Jian et al., Mining Sequential Patterns by Pattern-Growth: The PrefixSpan Approach, IEEE Transactions on Knowledge and Data Engineering, Oct. 2004, 17 pages, vol. 16, No. 10, IEEE Computer Society.

U.S. Appl. No. 14/799,369, filed Jul. 14, 2015, entitled Data Driven Speech Enabled Self-Help Systems and Method of Operating Thereof, 52 pages.

U.S. Appl. No. 14/586,730, System and Method for Interactive Mult-Resolution Topic Detection and Tracking, filed Dec. 30, 2014, 52 pages.

European Partial Supplementary Search Report for Application No. 16824960.5, dated Sep. 17, 2018, 14 pages.

Australian Government Examination Report No. 1 for Application No. 2016291566, dated Dec. 11, 2018, 4 pages.

Canadian Office Action for Application No. 2,995,577, dated Dec. 21, 2018, 3 pages.

Extended European Search Report for Application No. 16824960.5, dated Jan. 16, 2019, 14 pages.

Extended European Search Report for Application No. 16858164.3, dated Jul. 3, 2018, 10 pages.

Canadian Intellectual Property Office Action for Application No. 3,005,324, dated Mar. 11, 2019, 4 pages.

Australian Government Examination Report No. 1 for Application No. 2016341280, dated Jul. 3, 2019, 5 pages.

\* cited by examiner

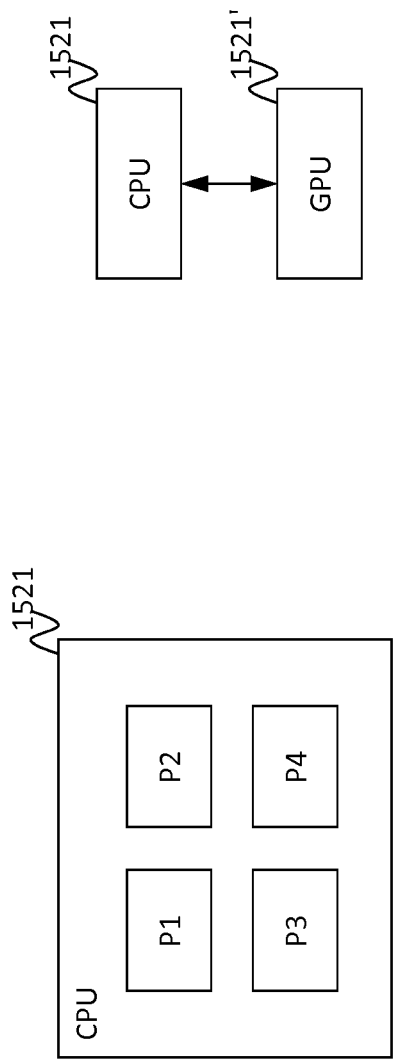

DATA DRIVEN SPEECH ENABLED SELF-HELP SYSTEMS AND METHODS OF OPERATING THEREOF

FIELD

Embodiments of the present invention relate to the field of software for operating contact centers, in particular, software and services for assisting people communicating with contact centers and methods for the automated and assisted configuration of such software and services.

BACKGROUND

Contact centers staffed by agents generally serve as an interface between an organization such as a company and outside entities such as customers. For example, human sales agents at contact centers may assist customers in making purchasing decisions and may receive purchase orders from those customers. Similarly, human support agents at contact centers may assist customers in solving problems with products or services provided by the organization. Interactions between contact center agents and outside entities (customers) may be conducted by speech voice (e.g., telephone calls), video (e.g., video conferencing), text (e.g., emails and text chat), or through other media.

At some contact centers, self-help systems may be configured to handle requests and questions from outside entities, without the involvement of a human agent at the contact center, thereby potentially reducing costs for the contact center. For example, self-help systems may suggest solutions to commonly experienced problems. Examples of self-help systems include the Nuance® Nina® and Genesys® Voice Platform (GVP) systems. Self-help systems may be implemented as interactive voice response (IVR) or interactive media response (IMR) systems having speech input capabilities (e.g., in addition to or instead of responding to dual-tone multi-frequency signals from keypresses).

Generally, self-help systems are customized on a per-organization basis in order to provide information and services that are relevant to the organization and the outside entities that the organization interacts with. For example, a wireless telephone carrier may configure a self-help system to automatically provide instructions for solving problems with cellular connectivity or email access, provide information regarding the customer's current bill, or accept payment information.

SUMMARY

Aspects of embodiments of the present invention are directed to systems and methods for assisting in the configuration and customization of a self-help system for a contact center. Aspects of embodiments of the present invention are also directed to systems and methods for automatically reconfiguring a self-help system based on additional collected information and for handling circumstances that were unforeseen during configuration.

According to one embodiment of the present invention, a method for configuring an automated, speech driven self-help system based on prior interactions between a plurality of customers and a plurality of agents includes: recognizing, by a processor, speech in the prior interactions between customers and agents to generate recognized text; detecting, by the processor, a plurality of phrases in the recognized text; clustering, by the processor, the plurality of phrases into a plurality of clusters; generating, by the processor, a plurality of grammars describing corresponding ones of the clusters; outputting, by the processor, the plurality of grammars; and invoking configuration of the automated self-help system based on the plurality of grammars.

The method may further include: receiving, by the processor, an input phrase during the configuration of the automated self-help system; determining, by the processor, whether the input phrase belongs to one or more matching clusters of the plurality of clusters; and in response to determining that the input phrase belongs to one or more matching clusters: identifying, by the processor, a plurality of suggested phrases from the one or more matching clusters; and outputting, by the processor, the suggested phrases associated with the one or more matching clusters.

The identifying the plurality of suggested phrases may include calculating a semantic distance between the input phrase and each of the phrases in each of the one or more matching clusters, wherein the suggested phrases may include phrases having a semantic distance below a threshold semantic distance and exclude phrases having a semantic distance above the threshold semantic distance.

The identifying the plurality of suggested phrases may include: identifying, by the processor, existing word groups and grammars associated with the input phrase.

The identifying the plurality of suggested phrases may include: identifying, by the processor, a generalized phrase corresponding to the input phrase.

According to one embodiment of the present invention, a method for automatically updating an automated, speech driven self-help system, includes: receiving, by a processor, audio that fails to match any phrases of a plurality of grammars of the automated self-help system, the audio being a portion of one or more recorded interactions between a caller and a contact center; recognizing, by the processor, speech within the audio to generate recognized text; identifying, by the processor, portions of the recognized text matching the phrases of the plurality of grammars; and outputting, by the processor, automatic semantic expansion of the phrase or suggest recognized utterances as candidates to add to grammars of the automated self-help system.

The identifying portions of the recognized text matching the phrases of the plurality of grammars may include: initializing an empty collection of matches; for each phrase in the phrases of the grammars, setting a subsequence size based on the size of the phrase and a window parameter; identifying a plurality of keywords, wherein the keywords may include words that are in the phrase and where stems of the words are not in a collection of stopwords; identifying a plurality of candidates in the recognized text, the candidates being subsequences of the recognized text having length equal to the subsequence size and containing at least one of the plurality of keywords; and for each candidate phrase in the candidate phrases: computing a match score between the candidate and the phrase; and adding the candidate to the collection of matches when the match score exceeds a threshold value; and returning the collection of matches.

The candidate may include a plurality of words, each word having a corresponding confidence, and the computing the match score between the candidate and the phrase may include: computing a plurality of phrase stems by stemming each word of the phrase; computing a plurality of recognized text stems by stemming each word of the candidate; computing a stem intersection of the phrase stems and the recognized text stems; computing a stem union of the phrase stems and the recognized text stems; computing a phrase score based on the number of phrase stems and the number of recognized text stems; and evaluating the match between the recognized text and the phrase based on the phrase score.

The computing the phrase score may include computing a stems score by dividing the number of words in the stem intersection by the number of words in the stem union.

The method may further include: identifying a plurality of stopwords in the phrase as a plurality of phrase stopwords; and identifying a plurality of stopwords in the recognized text as a plurality of recognized text stopwords, wherein the computing the phrase score may be further based on the number of phrase stopwords and the number of recognized text stopwords.

The computing the phrase score may include: computing a stopwords intersection of the phrase stopwords and the recognized text stopwords; computing a stopwords union of the phrase stopwords and the recognized text stopwords; computing a stems score by dividing the number of words in the stem intersection by the number of words in the stem union; computing a stopwords score by dividing the number of words in the stopwords intersection by the number of words in the stopwords union; and computing the phrase score in accordance with:

$$\alpha \times \text{stems score} + (1-\alpha) \times \text{stopwords score}$$

wherein $0 \leq \alpha \leq 1$.

The outputting automatic semantic expansion of the phrases may include: detecting an action taken by a caller after the audio that fails to match any phrases of the plurality of grammars; identifying a grammar corresponding to the action; and suggesting phrases of the grammar as the automatic semantic expansion.

According to one embodiment of the present invention, a method for providing an automated, speech driven self-help system of a contact center includes: receiving, by a processor, audio from a user; comparing, by the processor, the audio to a plurality of grammars of the speech driven self-help system; in response to the audio matching one of the plurality of grammars, identifying an action corresponding to the one of the plurality of grammars; in response to the audio failing to match any of the plurality of grammars, recognizing, by the processor, speech in the audio to generate recognized text; searching for similar phrases to identify a grammar corresponding to the recognized text; and identifying an action corresponding to the grammar corresponding to the recognized text; and executing the identified action.

The searching for similar phrases may include: initializing an empty collection of matches; for each phrase in the phrases of the grammars, setting a subsequence size based on the size of the phrase and a window parameter; identifying a plurality of keywords, wherein the keywords may include words that are in the phrase and where stems of the words are not in a collection of stopwords; identifying a plurality of candidates in the recognized text, the candidates being subsequences of the recognized text having length equal to the subsequence size and containing at least one of the plurality of keywords; and for each candidate phrase in the candidate phrases: computing a match score between the candidate and the phrase; and adding the candidate to the collection of matches when the match score exceeds a threshold value; and returning the collection of matches.

The candidate may include a plurality of words, each word having a corresponding confidence, and the computing the match score between the candidate and the phrase may include: computing a plurality of phrase stems by stemming each word of the phrase; computing a plurality of recognized text stems by stemming each word of the candidate; computing a stem intersection of the phrase stems and the recognized text stems; computing a stem union of the phrase stems and the recognized text stems; computing a phrase score based on the number of phrase stems and the number of recognized text stems; and evaluating the match between the recognized text and the phrase based on the phrase score.

The action may include generating a VoiceXML response.

According to one embodiment of the present invention, a system includes: a processor; and memory storing instructions that, when executed on the processor, cause the processor to: recognize speech in the prior interactions between customers and agents to generate recognized text; detect a plurality of phrases in the recognized text; cluster the plurality of phrases into a plurality of clusters; generate a plurality of grammars describing corresponding ones of the clusters; output the plurality of grammars; and invoke configuration of an automated self-help system based on the plurality of grammars.

The memory may further store instructions that, when executed on the processor, cause the processor to: receive an input phrase during the configuration of the automated self-help system; determine whether the input phrase belongs to one or more matching clusters of the plurality of clusters; and in response to determining that the input phrase belongs to one or more matching clusters: identify a plurality of suggested phrases from the one or more matching clusters; and output the suggested phrases associated with the one or more matching clusters.

The memory may further store instructions that, when executed on the processor, cause the processor to identify the plurality of suggested phrases by calculating a semantic distance between the input phrase and each of the phrases in each of the one or more matching clusters, wherein the suggested phrases may include phrases having a semantic distance below a threshold semantic distance and exclude phrases having a semantic distance above the threshold semantic distance.

The memory may further store instructions that, when executed on the processor, cause the processor to identify the plurality of suggested phrases by identifying, by the processor, existing word groups and grammars associated with the input phrase.

The memory may further store instructions that, when executed on the processor, cause the processor to identify the plurality of suggested phrases by identifying, by the processor, a generalized phrase corresponding to the input phrase.

According to one embodiment of the present invention, a system includes: a processor; and memory storing instructions that, when executed on the processor, cause the processor to receive audio that fails to match any phrases of a plurality of grammars of the automated self-help system, the audio being a portion of one or more recorded interactions between a caller and a contact center; recognize speech within the audio to generate recognized text; identify portions of the recognized text matching the phrases of the plurality of grammars; and output automatic semantic expansion of the phrase or suggest recognized utterances as candidates to add to grammars of the automated self-help system.

The memory may further store instructions that, when executed on the processor, cause the processor to: initialize an empty collection of matches; for each phrase in the phrases of the grammars, set a subsequence size based on the size of the phrase and a window parameter; identify a plurality of keywords, wherein the keywords may include words that are in the phrase and where stems of the words are not in a collection of stopwords; identify a plurality of candidates in the recognized text, the candidates being subsequences of the recognized text having length equal to the subsequence size and containing at least one of the plurality of keywords; and for each candidate phrase in the candidate phrases: compute a match score between the candidate and the phrase; and add the candidate to the collection of matches when the match score exceeds a threshold value; and return the collection of matches.

The candidate may include a plurality of words, each word having a corresponding confidence, and the memory may further store instructions that, when executed on the processor, cause the processor to compute the match score between the candidate and the phrase by: computing a plurality of phrase stems by stemming each word of the phrase; computing a plurality of recognized text stems by stemming each word of the candidate; computing a stem intersection of the phrase stems and the recognized text stems; computing a stem union of the phrase stems and the recognized text stems; computing a phrase score based on the number of phrase stems and the number of recognized text stems; and evaluating the match between the recognized text and the phrase based on the phrase score.

The memory may further store instructions that, when executed by the processor, cause the processor to compute the phrase score by computing a stems score by dividing the number of words in the stem intersection by the number of words in the stem union.

The memory may further store instructions that, when executed by the processor, cause the processor to: identify a plurality of stopwords in the phrase as a plurality of phrase stopwords; and identify a plurality of stopwords in the recognized text as a plurality of recognized text stopwords, wherein the memory may further store instructions that, when executed by the processor, cause the processor to compute the phrase score based on the number of phrase stopwords and the number of recognized text stopwords.

The memory may further store instructions that, when executed by the processor, cause the processor to compute the phrase score by: computing a stopwords intersection of the phrase stopwords and the recognized text stopwords; computing a stopwords union of the phrase stopwords and the recognized text stopwords; computing a stems score by dividing the number of words in the stem intersection by the number of words in the stem union; computing a stopwords score by dividing the number of words in the stopwords intersection by the number of words in the stopwords union; and computing the phrase score in accordance with:

$$\alpha \times \text{stems score} + (1-\alpha) \times \text{stopwords score}$$

wherein $0 \leq \alpha \leq 1$.

The memory may further store instructions that, when executed by the processor, cause the processor to output automatic semantic expansion of the phrases by: detecting an action taken by a caller after the audio that fails to match any phrases of the plurality of grammars; identifying a grammar corresponding to the action; and suggesting phrases of the grammar as the automatic semantic expansion.

According to one embodiment of the present invention, a system includes: a processor; and memory storing instructions that, when executed on the processor, cause the processor to: receive audio from a user; compare the audio to a plurality of grammars of the speech driven self-help system; in response to the audio matching one of the plurality of grammars, identify an action corresponding to the one of the plurality of grammars; in response to the audio failing to match any of the plurality of grammars, recognize speech in the audio to generate recognized text; search for similar phrases to identify a grammar corresponding to the recognized text; and identify an action corresponding to the grammar corresponding to the recognized text; and execute the identified action.

The memory may further store instructions that, when executed by the processor, cause the processor to search for similar phrases by: initializing an empty collection of matches; for each phrase in the phrases of the grammars, setting a subsequence size based on the size of the phrase and a window parameter; identifying a plurality of keywords, wherein the keywords may include words that are in the phrase and where stems of the words are not in a collection of stopwords; identifying a plurality of candidates in the recognized text, the candidates being subsequences of the recognized text having length equal to the subsequence size and containing at least one of the plurality of keywords; and for each candidate phrase in the candidate phrases: computing a match score between the candidate and the phrase; and adding the candidate to the collection of matches when the match score exceeds a threshold value; and returning the collection of matches.

The candidate may include a plurality of words, each word having a corresponding confidence, and wherein the memory may further store instructions that, when executed by the processor, cause the processor to compute the match score between the candidate and the phrase by: computing a plurality of phrase stems by stemming each word of the phrase; computing a plurality of recognized text stems by stemming each word of the candidate; computing a stem intersection of the phrase stems and the recognized text stems; computing a stem union of the phrase stems and the recognized text stems; computing a phrase score based on the number of phrase stems and the number of recognized text stems; and evaluating the match between the recognized text and the phrase based on the phrase score.

The action may include generating a VoiceXML response.

BRIEF DESCRIPTION OF THE DRAWINGS

The accompanying drawings, together with the specification, illustrate exemplary embodiments of the present invention, and, together with the description, serve to explain the principles of the present invention.

FIG. 7C is a block diagram of a computing device according to an embodiment of the present invention.

FIG. 7D is a block diagram of a computing device according to an embodiment of the present invention.

DETAILED DESCRIPTION

Figure 1:
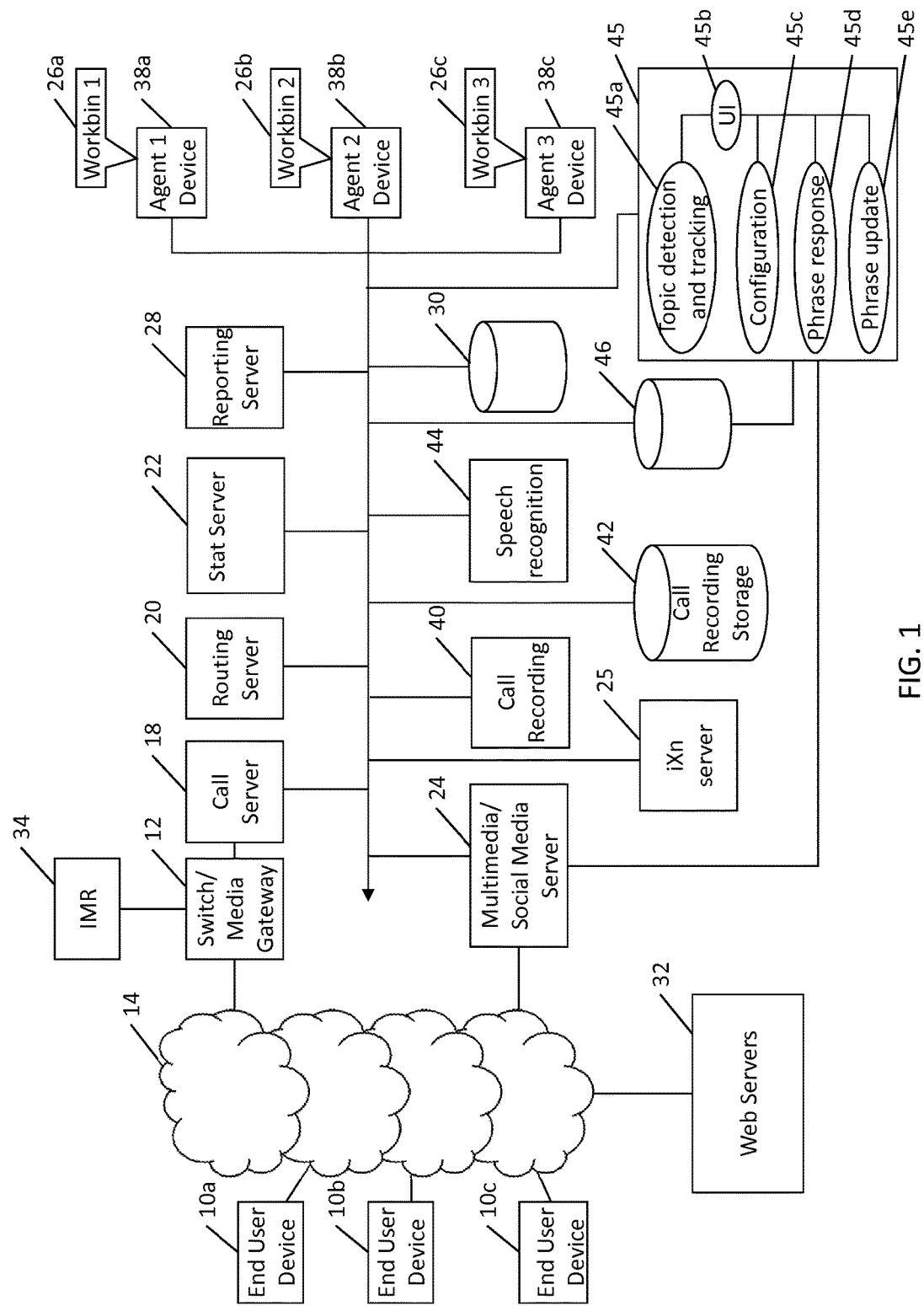
FIG. 1 is a schematic block diagram of a system for supporting a contact center in providing contact center services according to one exemplary embodiment of the invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Speech enabled self-help systems may provide benefits in terms of a reduced need for human agents to serve the needs of outside entities interacting with a contact center. For the sake of convenience, outside entities interacting with the contact center will be referred to herein as "customers," and may include situations where the outside entities are not engaged in commercial or business interactions with the contact center. These self-help systems are generally customized to the particular needs of the organizations supported by the self-help systems. Tools for performing this configuration enable the definition of Voice-XML (extensible markup language) and associated XML form grammar (GRXML) for configuring the self-service systems. However, setting, initializing, optimizing, and updating such systems is typically a manual process that is time consuming, expensive, and inefficient.

Some aspects of embodiments of the present invention directed to providing a data-driven setup that automatically generates Voice-XML and GRXML based grammars by learning from customer-agent calls. These learned grammars may be used as building blocks by self-help system configuration tools in order to assist a user (e.g., a human system administrator) in configuring the self-help systems. Some aspects of embodiments of the present invention are directed to automatically performing semantic expansion of phrases submitted by an administrator for detection by the self-help system. These aspects of the invention allow for faster and more thorough configuration of a self-help system.

Some aspects of embodiments of the present invention are directed to automatic and semi-automatic updating of a self-help system to detect parts of conversations that previously were not recognized by the self-help system.

Still other embodiments of the present invention are directed to performing best-guess matches between unmatched phrases spoken by a user and existing actions while the system is running (e.g., in response to an unmatched phrase at the time the unmatched phrase is provided to the self-help system).

Contact Center Overview

FIG. 1 is a schematic block diagram of a system for supporting a contact center in providing contact center services according to one exemplary embodiment of the invention. For the purposes of the discussion herein, interactions between customers using end user devices 10 and agents at a contact center using agent devices 38 may be recorded by call recording module 40 and stored in call recording storage 42. The recorded calls may be processed by speech recognition module 44 to generate recognized text which is stored in recognized text storage 46. In some embodiments of the present invention, an automated self-help system according to embodiments of the present invention is provided by automated self-help module 45, which includes a topic detection and tracking module 45a, a user interface module 45b, a configuration module 45c, a phrase response module 45d, and a phrase update module 45e, and which will be described in more detail below.

The contact center may be an in-house facility to a business or corporation for serving the enterprise in performing the functions of sales and service relative to the products and services available through the enterprise. In another aspect, the contact center may be a third-party service provider. The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

According to one exemplary embodiment, the contact center system manages resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers) desiring to receive services from the contact center may initiate inbound telephony calls to the contact center via their end user devices 10a-10c (collectively referenced as 10). Each of the end user devices 10 may be a communication device conventional in the art, such as, for example, a telephone, wireless phone, smart phone, personal computer, electronic tablet, and/or the like. Users operating the end user devices 10 may initiate, manage, and respond to telephone calls, emails, chats, text messaging, web-browsing sessions, and other multi-media transactions.

Inbound and outbound telephony calls from and to the end users devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, or any wireless network/technology conventional in the art, including but not limited to 3G, 4G, LTE, and the like.

According to one exemplary embodiment, the contact center includes a switch/media gateway 12 coupled to the communications network 14 for receiving and transmitting telephony calls between end users and the contact center. The switch/media gateway 12 may include a telephony switch configured to function as a central switch for agent level routing within the center. The switch may be a hardware switching system or a soft switch implemented via software. For example, the switch 12 may include an automatic call distributor, a private branch exchange (PBX), an IP-based software switch, and/or any other switch configured to receive Internet-sourced calls and/or telephone network-sourced calls from a customer, and route those calls to, for example, an agent telephony device. In this example, the switch/media gateway establishes a voice path/connection (not shown) between the calling customer and the agent telephony device, by establishing, for example, a connection between the customer's telephony device and the agent telephony device.

According to one exemplary embodiment of the invention, the switch is coupled to a call server 18 which may, for example, serve as an adapter or interface between the switch and the remainder of the routing, monitoring, and other call-handling components of the contact center.

The call server 102 may be configured to process PSTN calls, VoIP calls, and the like. For example, the call server 102 may include a session initiation protocol (SIP) server for processing SIP calls. According to some exemplary embodiments, the call server 102 may, for example, extract data about the customer interaction such as the caller's telephone number, often known as the automatic number identification (ANI) number, or the customer's internet protocol (IP) address, or email address, and communicate with other CC components and/or CC iXn controller 18 in processing the call.

According to one exemplary embodiment of the invention, the system further includes an interactive media response (IMR) server 34, which may also be referred to as a self-help system, virtual assistant, or the like. The IMR server 34 may be similar to an interactive voice response (IVR) server, except that the IMR server is not restricted to voice, but may cover a variety of media channels including voice. Taking voice as an example, however, the IMR server may be configured with an IMR script for querying calling customers on their needs. For example, a contact center for a bank may tell callers, via the IMR script, to "press 1" if they wish to get an account balance. If this is the case, through continued interaction with the IMR, customers may complete service without needing to speak with an agent. The IMR server 34 may also ask an open ended question such as, for example, "How can I help you?" and the customer may speak or otherwise enter a reason for contacting the contact center. The customer's speech may then be processed by the speech recognition module 44 and the customer's response may then be used by the routing server 20 to route the call to an appropriate contact center resource.

In more detail, a speech driven IMR receives audio containing speech from a user. The speech is then processed to find phrases and the phrases are matched with one or more speech recognition grammars to identify an action to take in response to the user's speech. For example, if a user says "what is my account balance?" then the speech driven IMR may attempt to match phrases detected in the audio (e.g., the phrase "account balance") with existing grammars associated with actions such as account balance, recent transactions, making payments, transferring funds, and connecting to a human customer service agent. Each grammar may encode a variety of ways in which customers may request a particular action. For example, an account balance request may match phrases such as "account balance," "account status," "how much money is in my accounts," and "what is my balance." Once a match between the spoken phrase from the user and a grammar is detected, the action associated with the grammar is performed in a manner similar to the receiving a user selection of an action through a keypress. These actions may include, for example, a VoiceXML response that is dynamically generated based on the user's request and based on stored business information (e.g., account balances and transaction records).

In some embodiments, the routing server 20 may query a customer database, which stores information about existing clients, such as contact information, service level agreement (SLA) requirements, nature of previous customer contacts and actions taken by contact center to resolve any customer issues, and the like. The database may be, for example, Cassandra or any non-SQL database, and may be stored in a mass storage device 30. The database may also be a SQL database an may be managed by any database management system such as, for example, Oracle, IBM DB2, Microsoft SQL server, Microsoft Access, PostgreSQL, MySQL, FoxPro, and SQLite. The routing server 20 may query the customer information from the customer database via an ANI or any other information collected by the IMR server 34.

According to one exemplary embodiment of the invention, the mass storage device(s) 30 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be maintained in a customer relations management (CRM) database hosted in the mass storage device 30 or elsewhere. The mass storage device may take form of a hard disk or disk array as is conventional in the art.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the term interaction is used generally to refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

Some embodiments of the present invention are described in the context of a contact center. However, embodiments of the present invention are not limited thereto and may also be used in under other conditions involving configuration of the detection of commands in a speech driven user interface.

Data-Driven Setup

Figure 2:
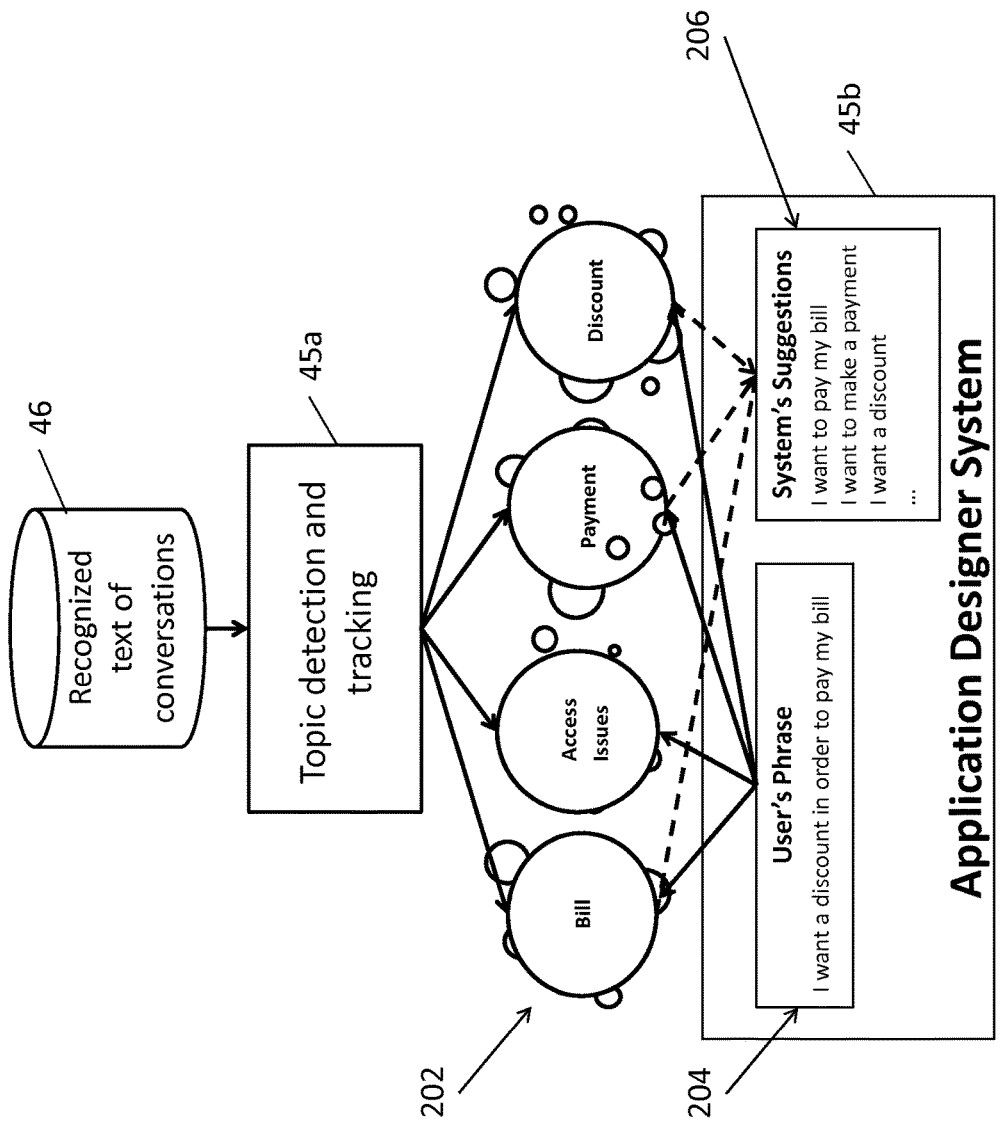
FIG. 2 is a schematic diagram illustrating interactions between a self-help system configuration module and a user system according to one embodiment of the present invention.

FIG. 2 is a schematic diagram illustrating interactions between a self-help system configuration module and a user system according to one embodiment of the present invention. Referring to FIG. 2, the recognized text output from the speech recognition module 44 as applied to a large collection of interactions (e.g., 100s of hours of recorded calls from the call recording storage 42) is provided to the topic detection and tracking system 45a of the self-help module 45. In some embodiments, these recorded interactions may be in "stereo," where the customer side of the interaction is saved separately from the agent side of the interaction, thereby making it easy to perform speech recognition for each side separately. However, embodiments of the present invention are not limited thereto.

Figure 3:
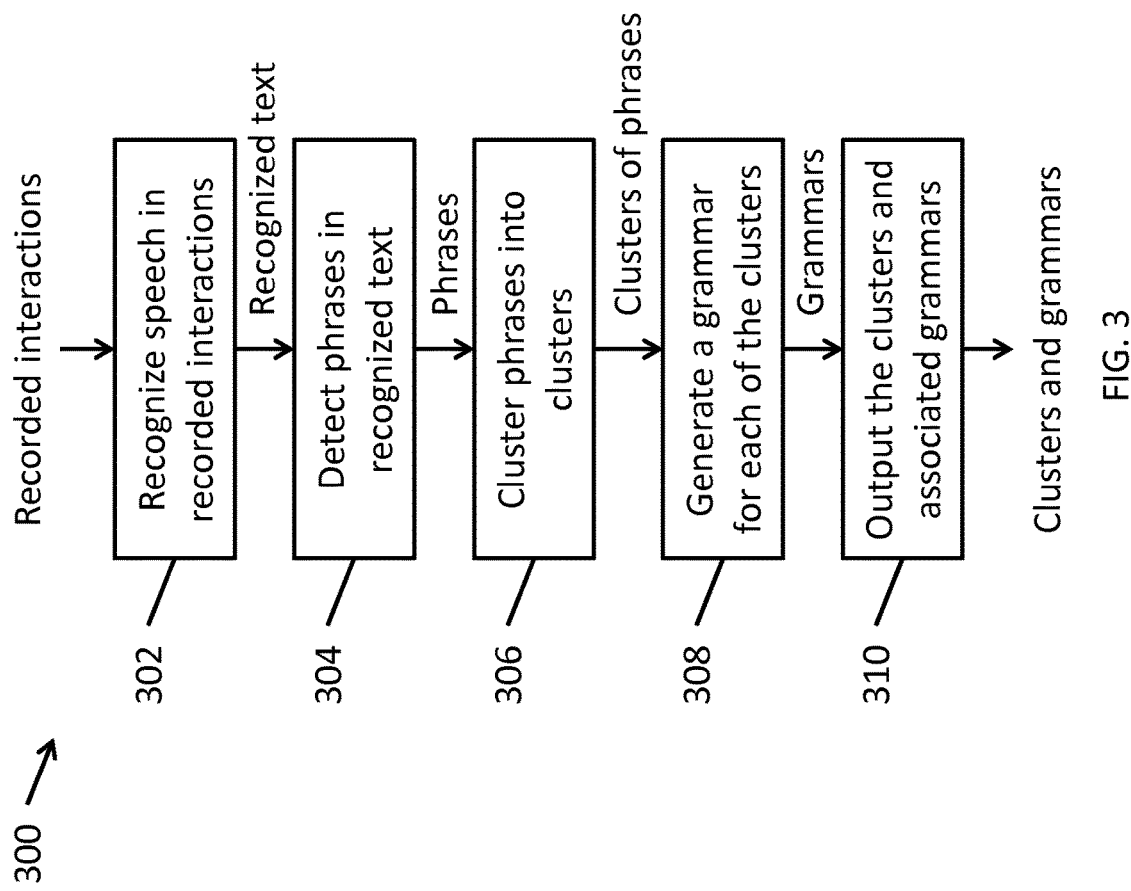
FIG. 3 is a flowchart of a method for generating topics, clusters, and grammars for use in configuring a system.

FIG. 3 is a flowchart of a method 300 for generating topics, clusters, and grammars for use in configuring the self-help system. In operation 302, the speech recognition module 44 recognizes speech in the recorded calls stored in call recording storage 42 to generate recognized text which is stored in recognized text storage 46. In operation 304, the topic detection and tracking system 45a detects phrases in the recognized text to generate a plurality of phrases and then clusters those phrases in operation 306 to generate a plurality of clusters or topics, where each of the topics 202 includes a plurality of phrases corresponding to that topic. For example, the phrases "I want to pay my bill," "I want to make a payment," and "I want a discount" may be associated with the topics "bill," "payment," and "discount," respectively. Systems and methods for detecting topics in recognized speech are described in more detail in U.S. patent application Ser. No. 14/586,730 "System and Method for Interactive Multi-resolution Topic Detection and Tracking," the entire disclosure of which is incorporated herein by reference.

In operation 308 the topic detection and tracking system 45a generates a grammar for each of the clusters. The grammars may be, for example, GRXML-based grammars that encode phrases. As a simple example, a grammar may be an item list, such as:

```
<item>
    <one-of>
        <item>delete</item>
        <item>erase</item>
        <item>delete my email</item>
        <item>delete my email tomorrow</item>
        <item>erase information</item>
        <item>erase all information</item>
    </one-of>
    <tag>result='delete'</tag>
</item>
```

In the above example grammar, the <tag> identifies the meaning or the action to be taken for the grammar ("delete") in response to the caller request.

In other embodiments of the present invention, the grammars and their corresponding actions may match a plurality of phrases in a cluster associated with a particular (human) agent action during an interaction between a customer and an agent. For example, the recorded calls stored in the call recording storage 42 may include many interactions (or calls) in which a customer pays a bill. Actions taken by an agent during the interaction (such as payment of a bill) can be detected based on agent desktop analytics that track commands entered by an agent on the agent device 38. As such, it can be inferred that one or more phrases spoken by a customer prior to the agent's initiation of the bill payment function must have triggered the agent's action. Therefore, phrases that commonly result in a bill payment action by an agent when spoken during a live interaction with a human agent would be added to the grammar associated with the bill payment action so that the same phrase spoken to the self-help would trigger the payment action. In another embodiment, correlations between bill payment phrases and bill payment actions may be detected by the agent desktop analytics based on a change in the customer's account balance within a short time interval (e.g., 30 seconds) after the customer speaks particular phrases. For example, the user may say "I want to pay my balance" and the agent desktop analytics may detect the agent clicking on a "payment" button on the agent device to update the balance. The correlation of the phrase with the event may be used to infer that the phrase "I want to pay my balance" is related to payments.

In still other embodiments of the present invention, clustering of the human agent responses to the customer's request can also suggest the type of action performed by the agent based on that request. For example, agent responses to particular customer requests can be clustered to determine topics that may then be presented to system designer using the user interface 45b that the system designer can associate actions with. For example, clustering agent phrases from recorded interactions may detect a category of phrases relating to closing accounts. As such, embodiments of the present invention may infer that the phrases spoken by customers before the agents spoke the phrases relating to closing accounts were requests to close their accounts.

In still another embodiment of the present invention a statistical language model (SLM) grammar can be estimated directly from the cluster material or in conjunction with a generic contact center SLM. For example, estimating the SLM can be done by adding the cluster material to generic contact center training material (generally human transcriptions of customer-agent calls), with significant weight given to the cluster materials. Methods for estimating statistical language models are described, for example, in Rosenfeld, R., "Two Decades of Statistical Language Modeling: Where Do We Go From Here?" *Proceedings of the IEEE*, Vol. 88, pp. 1270-1278, 2000. A set of search rules may be defined to decide upon a detection of relevant content within the LVCSR output of the SLM. In one embodiment, the detection decision is made according to the label of the cluster: If the output contains the cluster label text, a detection flag is raised and the action associated with that SLM is triggered. In the more general case, the system designer can choose several clusters from which to create a SLM. Here, the automatically generated search rule will be a disjunction of the clusters' labels.

The generated grammars are output in operation 310 for use by the configuration module 45c of the self-help system 45, as described in more detail below.

In one embodiment, a system administrator or system designer uses a system configuration user interface 45b to configure the self-help system. In particular, the system designer may generate a grammar for matching one or more phrases spoken by a user and associate that grammar with an action to take in response to detecting a phrase matching the grammar. For example, the phrase response module 45d of the automated self-help system 45 may receive audio portions of an interaction with a customer. The phrase response module 45d may detect that a customer is requesting a discount, may then evaluate whether the associated customer qualifies for a discount (e.g., based on a set of business rules and data stored about the customer) and, if the customer qualifies, may offer that discount to the customer. The user interface 45b may be, for example, a web-based user interface, an native client interface, or may expose an application programming interface (API) to a client application running on an end user device (e.g., a laptop computer or a smartphone).

To configure the system to perform such a function, the system designer uses the user interface 45b to supply one or more phrases 204 (as shown in FIG. 2 "I want a discount in order to pay my bill") and associates the phrase to a grammar of an appropriate response. Continuing the above example relating to an action for evaluating and providing discounts to customers, the system designer may supply the phrase "I want a discount in order to pay my bill."

However, a system designer may find it difficult to sufficiently capture the variety of ways in which a customer might express a particular concept. For example, a customer asking for a discount might say any of: "I would like a discount," "Please give me a discount," and "Can you lower my bill?"

As such, aspects of embodiments of the present invention are directed to systems and methods for providing automatic semantic expansion such as, for example, automatically suggesting phrases that are semantically similar to the phrase or phrases supplied by the system designer. For example, in response to supplying the phrase "I want a discount in order to pay my bill," the configuration module 45c of the automated self-help system 45 may identify matching topics from the topics 202 and identify suggested phrases 206 from those matching topics that correspond to the supplied phrase 204. The system designer may then select applicable phrases from those suggestions to add to the grammar for the action.

For example, as shown in FIG. 2, in response to the system designer's input phrase "I want a discount in order to pay my bill," the configuration module 45c may identify matching topics "bill," "payment," and "discount" (but not "access issues") from the topics 202. The configuration module 45c returns phrases "I want to pay my bill," "I want to make a payment," and "I want a discount" from these matching topics (in many situations, more than one phrase is returned from a topic) to be displayed in the user interface 45b. Of these suggestions, the designer may choose to add the phrase "I want a discount" because it is the only one of the suggested phrases that corresponds to the action of evaluating a customer for discount eligibility.

Figure 4:
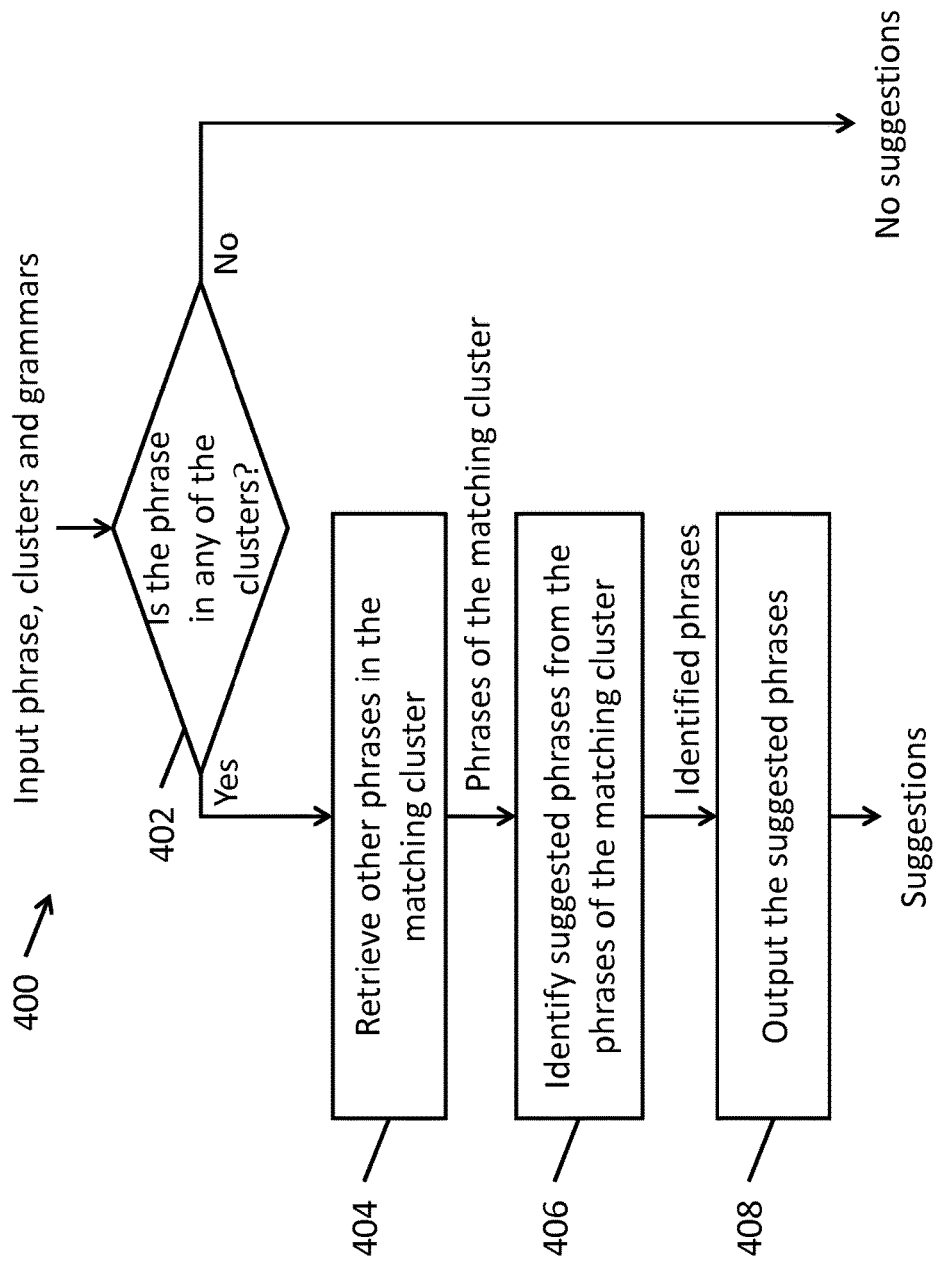
FIG. 4 is a flowchart of a method 400 for generating suggested phrases to add to the speech recognition grammar of the self-help system according to one embodiment of the present invention.

FIG. 4 is a flowchart of a method 400 for generating suggested phrases to add to the speech recognition grammar of the self-help system according to one embodiment of the present invention. In operation 402, the configuration module 45c determines if the phrase is in any of the clusters (e.g., the clusters generated according to the method shown in FIG. 3). If so, then in operation 404 the other phrases in that matching cluster are retrieved from the cluster. In operation 406, the other phrases of the matching cluster are evaluated to determine whether they should be suggested to the user. In operation 408, the suggested phrases (if any are found) are returned for display to the user. If the input phrase is not found in any of the clusters, then a semantic distance is computed between the input phrase and the medoids of the clusters. The system may then suggest phrases from each of the clusters where the semantic distance between the input phrase and the medoid of the cluster is below a threshold distance.

According to one embodiment of the present invention, identifying suggested phrases from the phrases of the matching cluster includes computing a semantic distance between the input phrase and each other phrase of the matching cluster. The resulting identified phrases are all of the phrases in the cluster having a semantic distance below a threshold semantic distance (or a threshold value).

According to another embodiment of the present invention, identifying suggested phrases based on an input phrase includes using existing word groups and grammars to expand words and sequences of words within the input phrase. According to another embodiment of the present invention, identifying suggested phrases based on an input phrase includes suggesting replacing specific words or terms (e.g., sequences of words) with a generic or "wildcard" term. These techniques are described in, for example, "Generalized Phrases in Automatic Speech Recognition Systems" U.S. patent application Ser. No. 14/150,628, the entire disclosure of which is incorporated herein by reference.

As such, embodiments of the present invention can automatically analyze recordings of interactions between customers and human agents at contact centers to develop a collection of topics and phrases associated with particular actions performed by the agents at the contact centers. Other aspects of embodiments of the present invention may then use the collection of topics and phrases to assist a human system designer in the configuration of a self-help system (e.g., a system for automatically providing information to and executing actions for a customer without the involvement of a human agent) by automatically suggesting potential alternate phrases for a supplied input phrase.

Automatic and Semi-Automatic Updating of Self-Help System Based on Unrecognized Phrases Collected During Runtime Aspects of embodiments of the present invention are directed to systems and methods for updating an automated self-help system initially configured as discussed above. For example, during production usage of the automated self-help system, some phrases may fail to be matched by the grammars configured by the system designer. In some embodiments of the present invention, such non-matching phrases are stored for later analysis and used to update the self-help system to associate new phrases with existing or new actions.

Figure 5A:
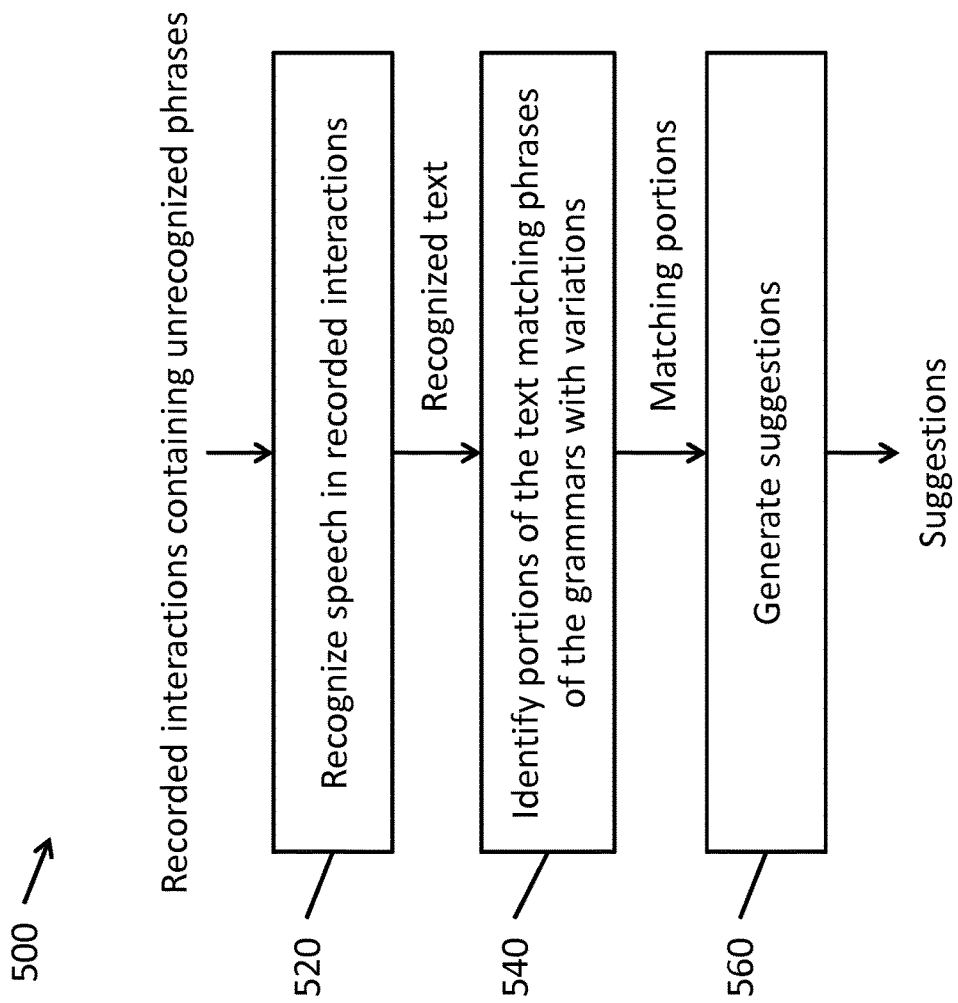
FIG. 5A is a flowchart of a method for adding previously received unrecognized phrases to the speech recognition grammars of the self-help system according to one embodiment of the present invention.

FIG. 5A is a flowchart of a method for adding previously received unrecognized phrases to the speech recognition grammars of the self-help system according to one embodiment of the present invention. In operation 520, recorded interactions containing unrecognized phrases (e.g., phrases that do not match any of the grammars defined in the self-help system) are processed by the speech recognition module 44 to recognize speech in the recorded interactions, thereby generating recognized text (e.g., a text transcript of the speech). In operation 540, the phrase update module 45e analyzes the recognized text to identify portions of the text that match phrases of the existing grammars with some variations. These variations allow matching of the unrecognized phrases with the existing grammars. The phrase update module 45e returns matching portions of the recognized text to a system designer via the user interface 45b as suggestions of phrases to add to the existing speech recognition grammars (e.g., the grammars that the portions matched with in operation 540). In some embodiments of the present invention, the phrases can be expanded using automatic semantic expansion, as described above.

Figure 5B:
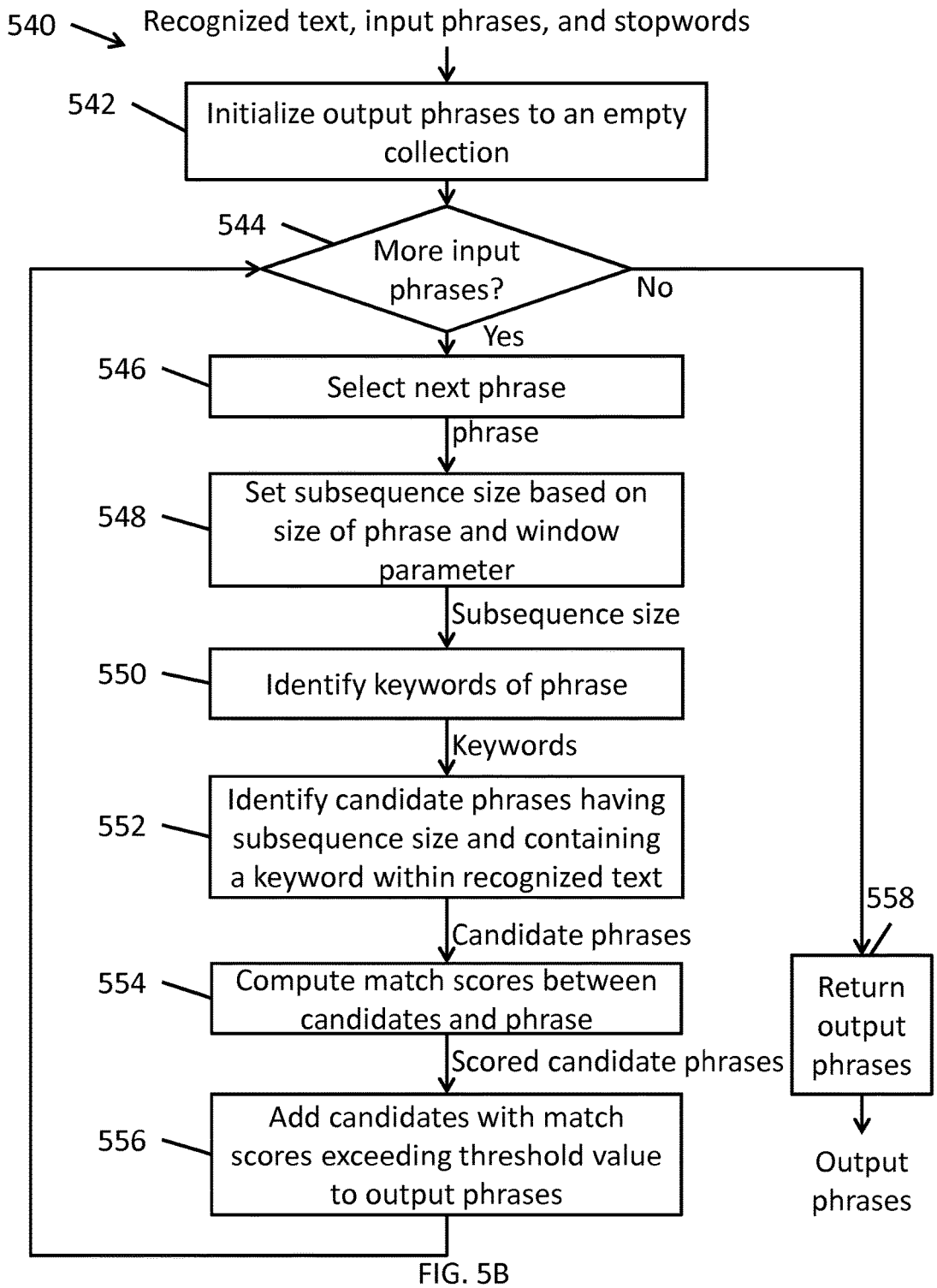
FIG. 5B is a more detailed flowchart of a method for identifying portions of the input text that match existing grammars according to one embodiment of the present invention.

FIG. 5B is a more detailed flowchart of a method for identifying portions of the input text that match existing grammars according to one embodiment of the present invention. As discussed above, given the output of the speech recognition module 44 (the "recognized text"), a set of input phrases corresponding to an existing grammar, and a set of stopwords (e.g., a list of stemmed words that have low semantic value such as pronouns, articles, and prepositions), a set of output phrases detected within the recognized text and matching one or more of the input phrases can be identified.

In operation 542, the phrase update module 45 initializes the output phrases to an empty collection (e.g., an empty list or an empty set). In operation 544, the phrase update module 45e determines if there are more phrases in the set of input phrases to be processed. If so, then in operation 546 the next phrase in the set of input phrases is selected. A subsequence size is set in operation 548 based on the size (e.g., in words or syllables) of the currently selected phrase and a window parameter (e.g., in words or syllables). The phrase update module 45e identifies a set of keywords of the phrase in operation 550, where the keywords are the words of the phrase whose stems are not stopwords, e.g., keywords={w|w∈phrase & stem(w)∉stopwords}.

In operation 552, one or more candidate phrases from within the recognized text are identified, where the candidate phrases are sequences of words within the recognized text that contain at least one keyword and that are of length equal to the subsequence size.

In operation 554, the phrase update module 45e computes a match score between each of the candidate phrases and the currently selected phrase. In operation 556, the phrase update module 45e adds, to the collection of output phrases, the candidate phrases having match scores exceeding a threshold value and the process returns to operation 544 to determine if there are more input phrases to compare to the recognized text. If there are no more phrases, then the collection of output phrases is returned in operation 558 (e.g., so that the output phrases can be displayed by the user interface 45b or added directly to the existing grammars).

The window size and the threshold are tunable parameters that can be adjusted based on a training set of previously identified phrases for the current environment (e.g., for a contact center in a particular industry or fielding a particular set of questions from customers).

Figure 5C:
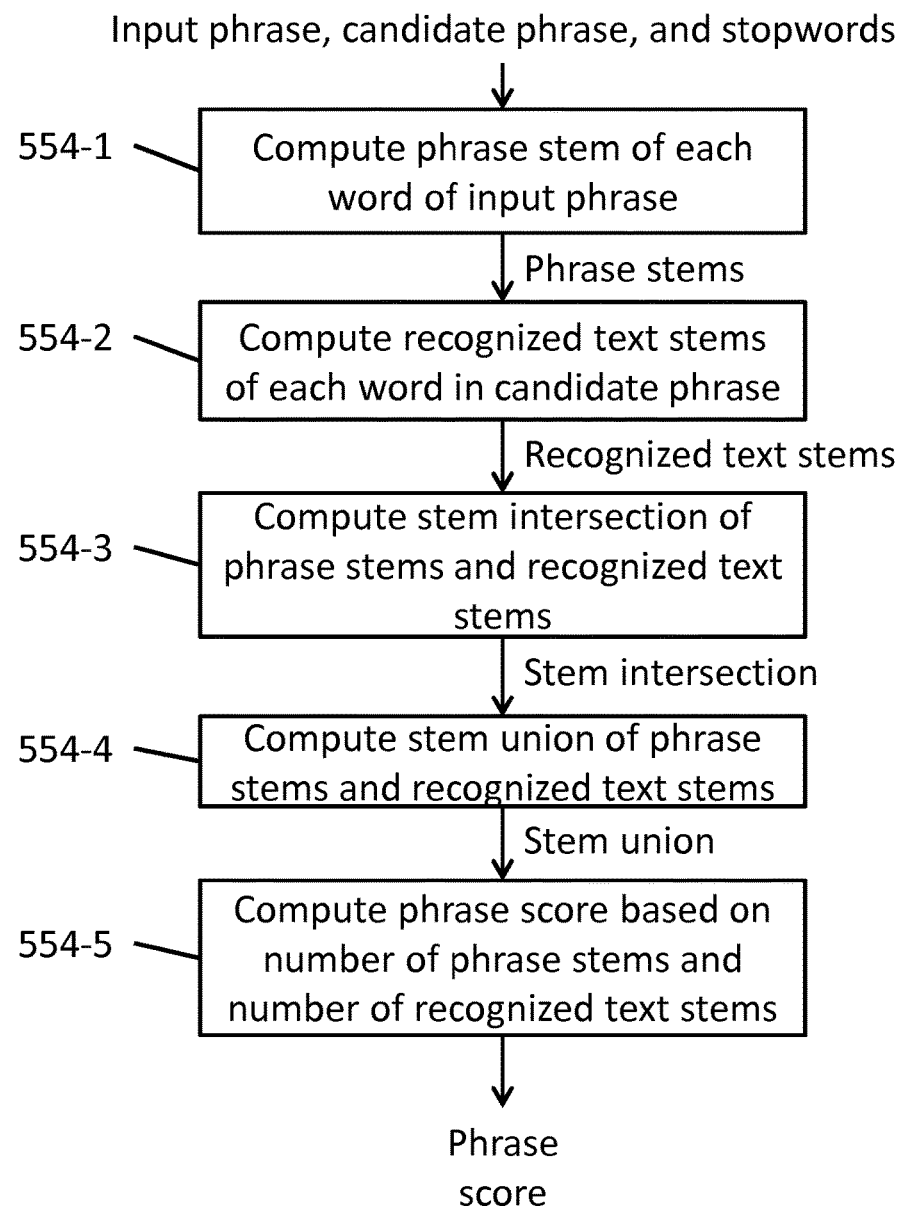
FIG. 5C is a more detailed flowchart of a method for computing a match score between an input phrase and a candidate phrase according to one embodiment of the present invention.

FIG. 5C is a more detailed flowchart of a method for computing a match score between an input phrase and a candidate phrase, given a set of stopwords, according to one embodiment of the present invention. In operation 554-1, a set of phrase stems is computed from the words in the phrase:

phrase stems={stem(w)+w∈phrase}

Similarly, in operation 554-2, a set of recognized text stems is computed from the words in the candidate phrase:

recognized text stems={stem(w)|w∈candidate phrase}

In operation 554-3, a stem intersection is computed in accordance with identifying words that are in both the phrase stems and in the recognized text stems:

stem intersection=phrase stems∩recognized text stems

In operation 554-4, a stem union is computed in accordance with identifying words that appear in the phrase stems, in the recognized text stems, or both:

stem union=phrase stems∪recognized text stems

In operation 554-5, a phrase score is computed based on the number of phrase stems and the number of recognized text stems. For example, in one embodiment, the phrase score is based on a stem score which is computed by dividing the size of the stem intersection by the size of the stem union to compute:

$$\text{stem score} = \frac{|\text{phrase stems} \cap \text{recognized text stems}|}{|\text{phase stems} \cup \text{recognized text stems}|}$$

$$= \frac{|\text{stem intersection}|}{|\text{stem union}|}$$

In some embodiments of the present invention, the method of computing a score further includes removing stopwords from the evaluation of the score because these stopwords may unduly increase a score but provide little actual semantic value. For example, a set of phrase stopwords may be computed as words that appear in the phrase stems and that are also among the stopwords:

phrase stopwords={w|w∈phrase stems & w∈stopwords}

Similarly, the recognized text stopwords may be computed as words that are in the recognized text stems and that are also in the stopwords:

recognized text stopwords={w|w∈recognized text stems & w∈stopwords}

In this embodiment, the phrase stems and the recognized text stems are updated to remove the stopwords:

phrase stems=phrase stems\phrase stopwords recognized text stems=recognized text stems\recognized text stopwords A stopword score can then be computed in a manner similar to that of the from the phrase stems and from the recognized text stems and further subtracting a stopwords score from the final phrase score. In more detail, $$\textit{stopwords} \text{ score} = \frac{|\text{phrase } \textit{stopwords} \cap \text{recognized text } \textit{stopwords}|}{|\text{phase } \textit{stopwords} \cup \text{recognized text } \textit{stopwords}|}$$

$$= \frac{|\textit{stopwords} \text{ intersection}|}{|\textit{stopwords} \text{ union}|}$$

As such, a final phrase score may be computed as:

phrase score=α×stem score+(1−α)×stopwords score where α is a parameter where 0.5≤α≤1 and α can be tuned based on, for example, a training set (e.g., previously unrecognized phrases that were manually assigned to grammars). Generally, α will not require frequent retuning because the set of stopwords is typically stable. However, in some circumstances with environments having frequent changes, just-in-time ("JIT") grammars may be used to capture a rapidly changing landscape of stopwords, thereby requiring more frequent retuning of the α parameter.

According to another embodiment of the present invention, the SCLITE algorithm as described, for example, in Fiscus, Jon. "Sclite scoring package version 1.5." *US National Institute of Standard Technology (NIST), URL http://www.itl.nist.gov/iaui/*894.01/*tools* (1998). may be used to perform the matching between a phrase and a candidate.

Improving Detection During Runtime

According to one embodiment of the present invention, the matching process performed by the phrase response module 45d can be improved by comparing the detected phrase to the user's subsequent actions. For example, when recognizing speech and automatically determining an action based on the recognized speech, there are two possible matches: true positives, in which the system matched the correct grammar for the user's intent; and false positives, in which the system matched the wrong grammar for the user's intent. Whether the match was a true positive or a false positive can be determined based on the user's next actions.

For example, if a user had asked for "help with my mobile phone" and the system directed the user to frequently asked questions about mobile phones and the user continued exploring that portion of the self-help system, then the match would likely have been a true positive. On the other hand, if the "help with my mobile phone" and the system directed the user to a portion of the self-help system for addressing billing problems, the user would likely request the self-help system to go "back" to the previous menu or if the user ended the session (e.g., hung up the phone). In such a circumstance, the match would have been a false positive.

By learning true positive and false positive samples, embodiments of the present invention can adapt the probabilities (or posterior probabilities or priors or weights) of its parameters by decreasing the importance of false positive matches or increasing the probabilities of the true positive matches. This can be done either automatically or semi-automatically by presenting the information to the system designer and asking for approval to change the probabilities (or to edit the phrases) or to let the designer manually decide how to change the probabilities. The posterior probability of the action given the recognized speech is:

$$P(\text{Action}|\text{recognized speech}).$$

These probabilities can be learned by initializing them to prior values and then updating them (e.g., during run-time) based on detected true positives and false positives. During run-time (e.g., when recognizing phrases spoken by customers) the probabilities will be used as follows: the detected phrase is compared with the GRXML grammars; if the probability of the match is less than a certain value then there will be another confirmation step with the user (e.g., "Do you have a billing problem?") and if the probability is above a certain value then the action will be performed automatically without further confirmation from the user. A phrase having a lower probability decreases its ranking in the grammar recognition (or matching) process, whereas a phrase having a higher probability will increase its ranking in the grammar recognition process.

Figure 6:
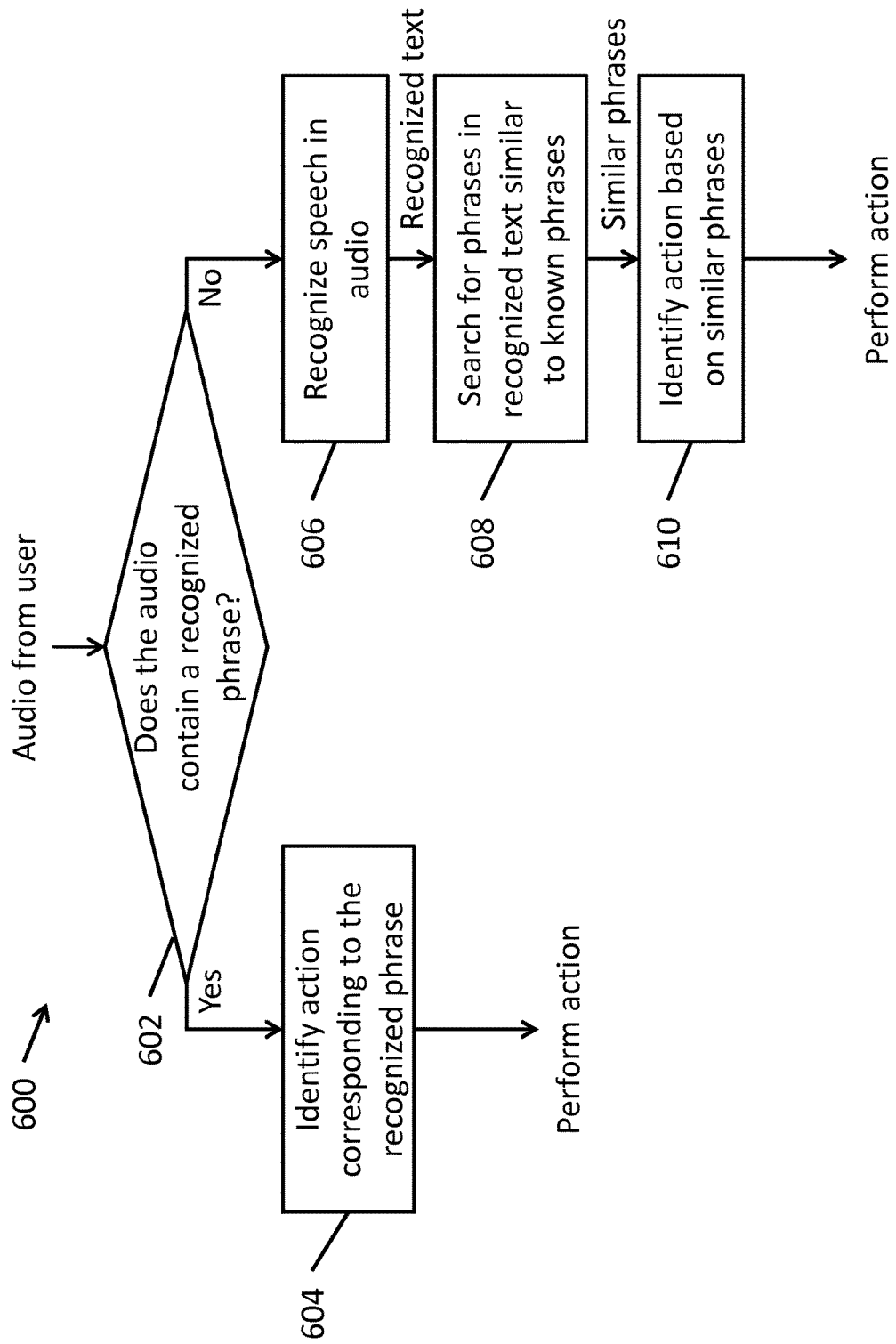
FIG. 6 is a flowchart of a method for identifying an action corresponding to an unrecognized phrase according to one embodiment of the present invention.

FIG. 6 is a flowchart of a method 600 for identifying an action corresponding to an unrecognized phrase according to one embodiment of the present invention. In particular, during normal runtime (e.g., while interacting with live users), the self-help system 45 and/or the IMR 34 according to embodiments of the present invention may receive a phrase from a customer where the phrase does not match any of the grammars configured in the self-help system. Therefore, some embodiments of the present invention are directed to determining a potentially matching action for the unrecognized phrase.

Referring to FIG. 6, in operation 602, the phrase response module 45d of the self-help system 45 determines whether the audio contains a recognized phrase, e.g., whether the audio contains a phrase matching any of the existing grammars for the actions that are defined for the self-help system. If so, then the phrase response module 45d or the IMR 34 identifies the action corresponding action in operation 604 and then performs the action (e.g., directing the customer to a particular piece of information or generating a VoiceXML response based on business information stored in the database). On the other hand, if the audio does not contain a recognized phrase, then automatic speech recognition is performed on the audio in operation 606 (e.g., by the speech recognition module 44), which produces recognized text. The recognized text can then be searched by the phrase response module in operation 608 to identify phrases within the recognized text that are similar to known phrases. This search process may be substantially the same as the process for identifying an action or grammar to add an unrecognized phrase to as described above with respect to FIGS. 5B and 5C, wherein each known phrase is compared to candidate phrases of the recognized text. An existing action may then be selected by identifying the corresponding grammar containing the phrase that has the highest match score with any of the candidate phrases of the recognized text and that selected action may then be performed. Thereby allowing some action to be performed by the self-help system 45, even when the given phrase does not match any existing grammar.

As such, various aspects of embodiments of the present invention provide for simplified configuration and updating of a self-help system by automatically analyzing recorded interactions and by automatically and semi-automatically identifying phrases to be associated with particular actions or topics, thereby improving the coverage of the variety of potential ways in which a customer may phrase a request to the automated self-help system.

Computing Devices

As described herein, various applications and aspects of the present invention may be implemented in software, firmware, hardware, and combinations thereof. When implemented in software, the software may operate on a general purpose computing device such as a server, a desktop computer, a tablet computer, a smartphone, or a personal digital assistant. Such a general purpose computer includes a general purpose processor and memory.

Each of the various servers, controllers, switches, gateways, engines, and/or modules (collectively referred to as servers) in the afore-described figures may be a process or thread, running on one or more processors, in one or more computing devices 1500 (e.g., FIG. 7A, FIG. 7B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 7A:
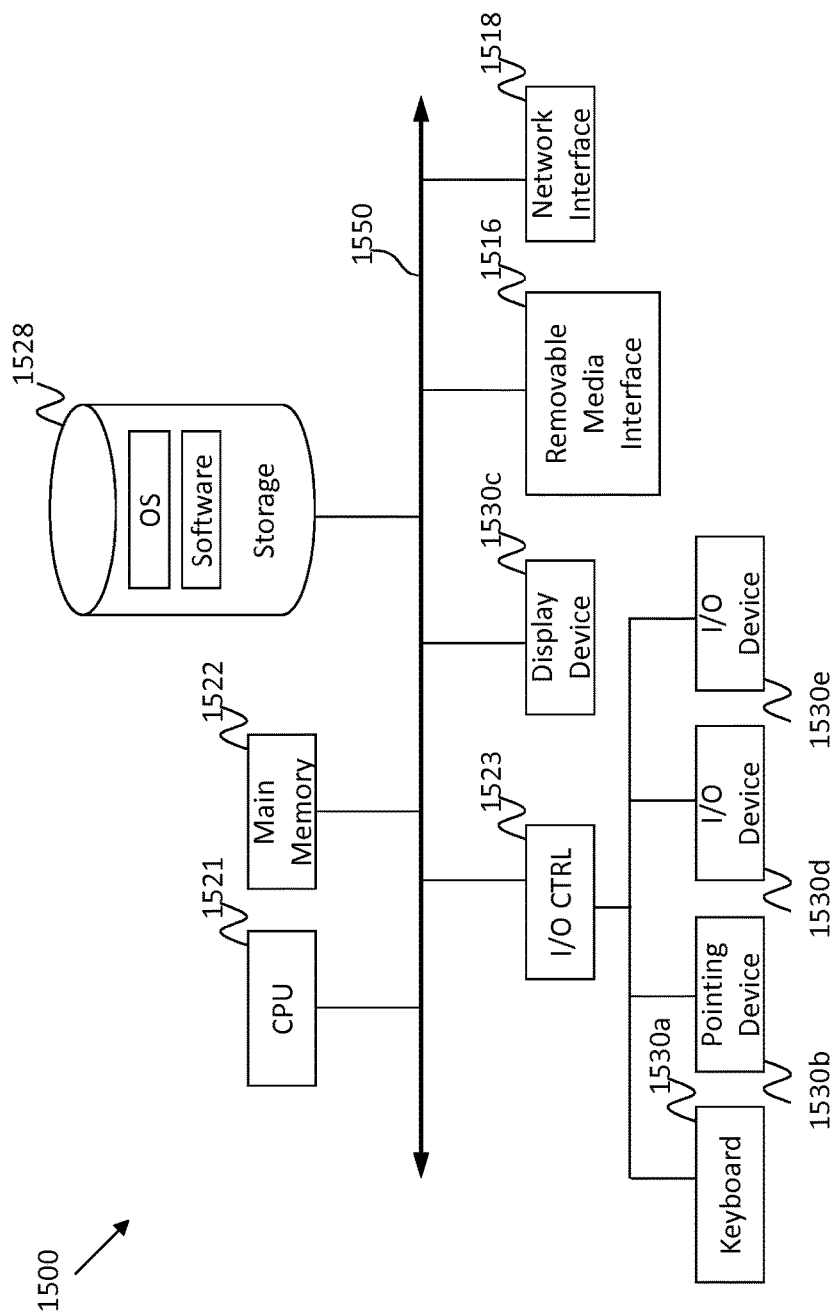
FIG. 7A is a block diagram of a computing device according to an embodiment of the present invention.
Figure 7B:
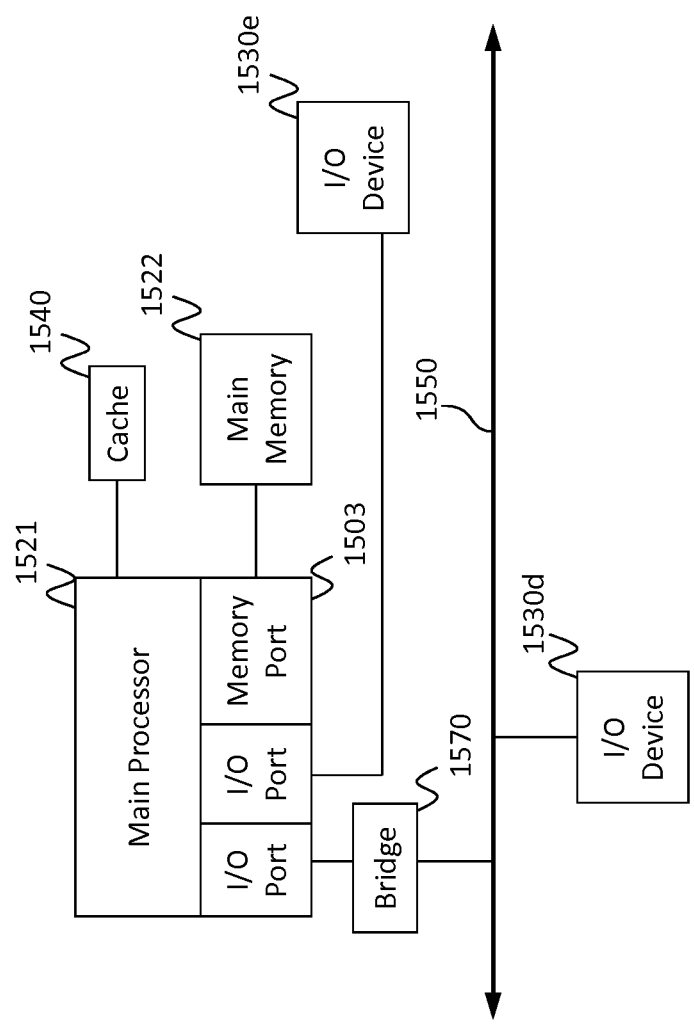
FIG. 7B is a block diagram of a computing device according to an embodiment of the present invention.

FIG. 7A and FIG. 7B depict block diagrams of a computing device 1500 as may be employed in exemplary embodiments of the present invention. Each computing device 1500 includes a central processing unit 1521 and a main memory unit 1522. As shown in FIG. 7A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 7B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 7A, the central processing unit 1521 communicates with the main memory 1522 via a system bus 1550. As shown in FIG. 7B, the central processing unit 1521 may also communicate directly with the main memory 1522 via a memory port 1503.

FIG. 7B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 7A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 7B depicts an embodiment of a computer 1500 in which the central processing unit 1521 communicates directly with I/O device 1530e. FIG. 7B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 7A, may control the I/O devices. The I/O controller may control one or more I/O devices such as a keyboard 1530a and a pointing device 1530b, e.g., a mouse or optical pen.

Referring again to FIG. 7A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further include a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may include or be connected to multiple display devices 1530c, which each may be of the same or different type and/or form. As such, any of the I/O devices 1530 and/or the I/O controller 1523 may include any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect, or otherwise use the display devices 1530c. In one embodiment, a video adapter may include multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530*c*.

A computing device 1500 of the sort depicted in FIG. 7A and FIG. 7B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 includes a combination of devices, such as a mobile phone combined with a digital audio player or portable media player.

As shown in FIG. 7C, the central processing unit 1521 may include multiple processors P1, P2, P3, P4, and may provide functionality for simultaneous execution of instructions or for simultaneous execution of one instruction on more than one piece of data. In some embodiments, the computing device 1500 may include a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 includes a multicore microprocessor, which combines two or more independent processors into a single package, e.g., into a single integrated circuit (IC). In one exemplary embodiment, depicted in FIG. 7D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 7E:
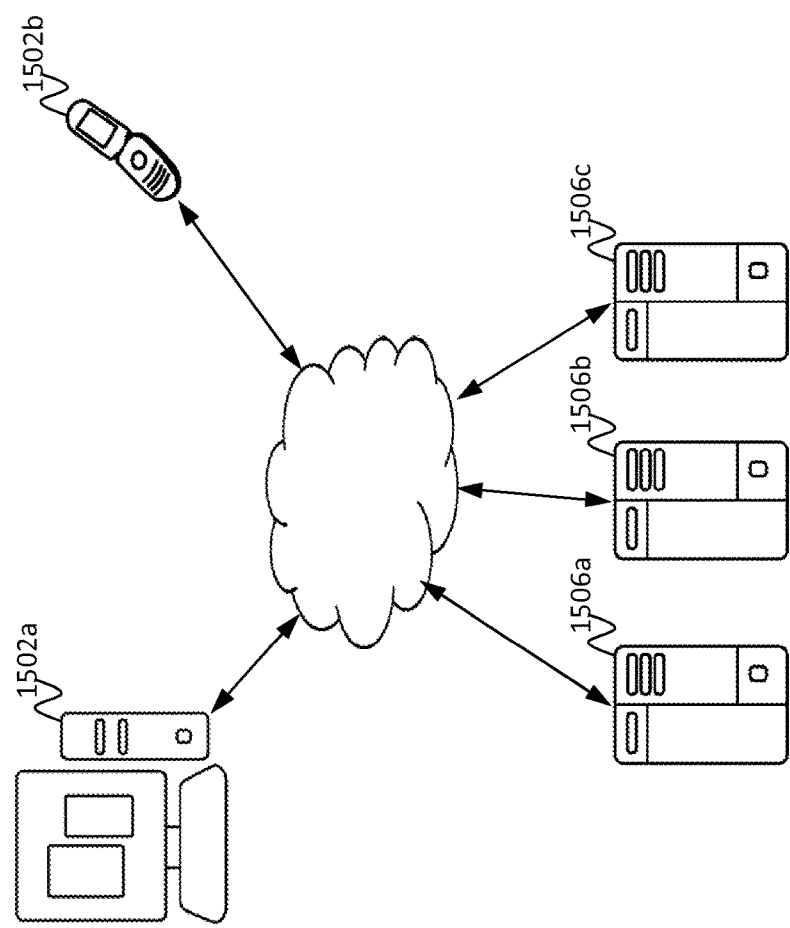
FIG. 7E is a block diagram of a network environment including several computing devices according to an embodiment of the present invention.

A computing device may be one of a plurality of machines connected by a network, or it may include a plurality of machines so connected. FIG. 7E shows an exemplary network environment. The network environment includes one or more local machines 1502*a*, 1502*b* (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506*a*, 1506*b*, 1506*c* (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502*a*, 1502*b*. Although only two clients 1502 and three server machines 1506 are illustrated in FIG. 7E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may include a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 7E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for configuring an automated, speech driven interactive response system based on prior interactions between a plurality of customers and a plurality of agents, the method comprising:
   recognizing, by a processor, speech in the prior interactions between customers and agents to generate recognized text;
   detecting, by the processor, a plurality of phrases in the recognized text;
   clustering, by the processor, the plurality of phrases into a plurality of clusters, each cluster comprising a plurality of phrases corresponding to a topic;
   receiving, by the processor, an input phrase to configure the automated interactive response system to perform an action in response to customer speech comprising the input phrase;
   determining, by the processor, whether the input phrase belongs to one or more matching clusters of the plurality of clusters;
   in response to determining that the input phrase belongs to one or more matching clusters:
      identifying, by the processor, a plurality of suggested phrases from the one or more matching clusters, the suggested phrases comprising a generalized phrase corresponding to the input phrase, the generalized phrase comprising a wildcard term replacing one or more words or terms of the input phrase; and
      outputting, by the processor, the suggested phrases associated with the one or more matching clusters, the suggested phrases being semantically similar to the input phrase;
   in response to determining that the input phrase does not belong to one or more matching clusters:
      computing a semantic distance between the input phrase and a plurality of medoids of the plurality of clusters; and
      outputting the suggested phrases associated with a cluster of the plurality of clusters wherein the semantic distance between the input phrase and a medoid of the cluster is below a threshold distance;
   generating, by the processor, a grammar of a plurality of grammars, the grammar being configured to match the input phrase and at least one of the suggested phrases in accordance with the generalized phrase comprising the wildcard term, the grammar being associated with the action to trigger the automated interactive response system to perform the action in response to detecting the input phrase or the at least one of the suggested phrases;
   outputting, by the processor, the grammar of the plurality of grammars; and
   invoking configuration of the automated interactive response system based on the plurality of grammars by configuring the automated interactive response system to automatically:
      receive audio from a customer;
      compare the audio to the plurality of grammars to identify an action associated with a grammar matching the audio;
      generate a response in accordance with the action associated with the matching grammar; and
      transmit the response to the customer.

2. The method of claim 1, wherein the identifying the plurality of suggested phrases comprises calculating a semantic distance between the input phrase and each of the phrases in each of the one or more matching clusters, wherein the suggested phrases include phrases having a semantic distance below a threshold semantic distance and exclude phrases having a semantic distance above the threshold semantic distance.

3. The method of claim 1, wherein the identifying the plurality of suggested phrases comprises: identifying, by the processor, existing word groups and grammars associated with the input phrase.

4. A system comprising:
   a processor; and
   memory storing instructions that, when executed on the processor, cause the processor to:
      recognize speech in a plurality of prior interactions between customers and agents to generate recognized text;
      detect a plurality of phrases in the recognized text;
      cluster the plurality of phrases into a plurality of clusters, each cluster comprising a plurality of phrases corresponding to a topic;
      receive an input phrase to configure an automated interactive response system to perform an action in response to customer speech comprising the input phrase;
      determine whether the input phrase belongs to one or more matching clusters of the plurality of clusters;
      in response to determining that the input phrase belongs to one or more matching clusters:
         identify a plurality of suggested phrases from the one or more matching clusters, the suggested phrases comprising a generalized phrase corresponding to the input phrase, the generalized phrase comprising a wildcard term replacing one or more words or terms of the input phrase; and
         output the suggested phrases associated with the one or more matching clusters, the suggested phrases being semantically similar to the input phrase;
      in response to determining that the input phrase does not belong to one or more matching clusters:
         compute a semantic distance between the input phrase and a plurality of medoids of the plurality of clusters; and
         output the suggested phrases associated with a cluster of the plurality of clusters wherein the semantic distance between the input phrase and a medoid of the cluster is below a threshold distance;
      generate a grammar of a plurality of grammars, the grammar being configured to match the input phrase and at least one of the suggested phrases in accordance with the generalized phrase comprising the wildcard term, the grammar being associated with the action to trigger the automated interactive response system to perform the action in response to detecting the input phrase or the at least one of the suggested phrases;
      output the grammar of the plurality of grammars; and
      invoke configuration of an automated interactive response system based on the plurality of grammars, the configuration of the automated interactive response system comprising configuring the automated interactive response system to automatically:
         receive audio from a customer;
         compare the audio to the plurality of grammars to identify an action associated with a grammar matching the audio;
         generate a response in accordance with the action associated with the matching grammar; and
         transmit the response to the customer.

5. The system of claim 4, wherein the memory further stores instructions that, when executed on the processor, cause the processor to identify the plurality of suggested phrases by calculating a semantic distance between the input phrase and each of the phrases in each of the one or more matching clusters,
   wherein the suggested phrases include phrases having a semantic distance below a threshold semantic distance and exclude phrases having a semantic distance above the threshold semantic distance.

6. The system of claim 4, wherein the memory further stores instructions that, when executed on the processor, cause the processor to identify the plurality of suggested phrases by identifying, by the processor, existing word groups and grammars associated with the input phrase.

7. The method of claim 1, wherein the automated interactive response system is an interactive voice response (IVR) system.

8. The method of claim 1, wherein the automated interactive response system is an interactive media response (IMR) system.

9. The system of claim 4, wherein the automated interactive response system is an interactive voice response (IVR) system.

10. The system of claim 4, wherein the automated interactive response system is an interactive media response (IMR) system.

* * * * *